United States Patent Office 3,518,274
Patented June 30, 1970

3,518,274
PHENYL SUBSTITUTED N-(2-AMINOETHYL)-
N-BENZYLAMIDES
Wallace Glenn Strycker, Goshen, Ind., assignor to Miles
Laboratories, Inc., Elkhart, Ind., a corporation of
Indiana
No Drawing. Continuation-in-part of application Ser. No.
569,047, Aug. 1, 1966. This application Oct. 9, 1967,
Ser. No. 674,007
Int. Cl. C07d 29/30
U.S. Cl. 260—294                    2 Claims

ABSTRACT OF THE DISCLOSURE

A series of phenyl substituted N-(2-aminoethyl)-N-benzylamides in which the ethyl group is substituted in the 1 or 2 position by a phenyl group, prepared by reacting a haloacyl halide including a phenyl group with benzylamine, reacting the product with a compound of the formula BH wherein B is a heterocyclic group, reducing the resulting product and forming the desired compound with a final acylation. These compounds display analgetic activity.

---

This application is a continuation-in-part of copending application Ser. No. 569,047 filed Aug. 1, 1966, now abandoned.

This invention relates to a novel series of compounds having beneficial pharmacological activity. More particularly, this invention relates to a new series of phenyl substituted N-(2-aminoethyl)-N-benzylamides in which the ethyl group is substituted in the 1 or 2 position with the phenyl group.

The compounds of this invention may be represented by the generic structural formula:

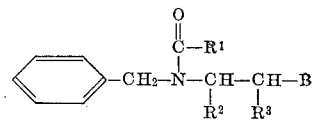

in which $R^1$ is a member selected from the group consisting of lower alkyl, such as ethyl or t-butyl, lower cycloalkyl, such as cyclopropyl, aryl, such as phenyl and a heterocyclic radical, such as 2-furyl, $R^2$ is a member selected from the group consisting of hydrogen and phenyl, $R^3$ is a member selected from the group consisting of hydrogen and phenyl, one of $R^2$ and $R^3$ being hydrogen and one of $R_2$ and $R_3$ being phenyl and B is a heterocyclic radical selected from the group consisting of piperazyl, piperidyl, morpholinyl, substituted piperazyl, and substituted piperidyl, the substituents selected from the group consisting of hydrogen, hydroxy, and phenyl, the heterocyclic radical being connected to the adjacent CH group through a nitrogen atom of the heterocyclic radical. For example, suitable substituted heterocyclic radicals that may be connected to the alkylene side-chain include 4-phenyl-1-piperidyl, 4-phenyl-4-hydroxy-1-piperidyl, and 4-phenyl-1-piperazinyl. Especially preferred are those compounds in which $R^3$ is phenyl.

The compounds of this invention can be readily prepared by reacting the appropriate ethylene diamines with an acylating agent such as an acyl halide, ester, carboxylic acid or anhydride. The desired ethylene diamine derivatives can be readily prepared by means of a series of synthetic reactions, such as those illustrated in the following equations, which show the preparation of a representative compound N-benzyl-N-[2-phenyl-2-(4-phenyl-1-piperidyl)ethyl] propionamide, V in which $R^1$ is ethyl, $R^2$ is hydrogen, $R^3$ is phenyl and B is 4-phenyl-1-piperidyl:

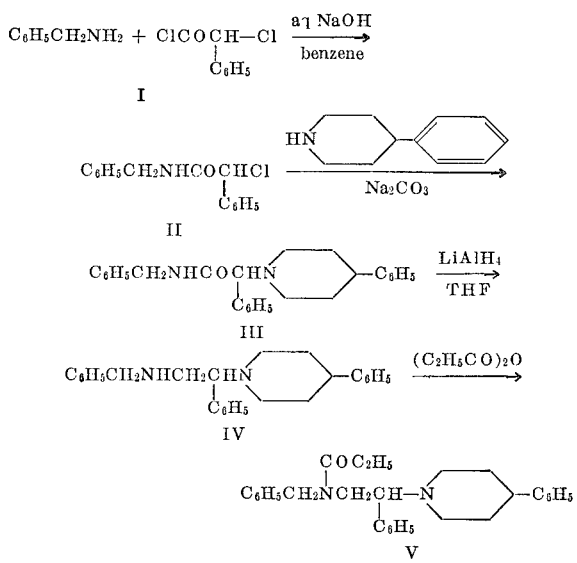

As can be seen from the above equations, the product, in the form of its free base, is prepared by reacting the ethylene diamine derivative N-[2-phenyl-2-(4-phenyl-1-piperidyl)ethyl] benzylamine, IV with propionic anhydride. This reaction is most conveniently carried out by refluxing the reactants in the presence of an inert solvent such as chloroform, benzene or pyridine. The intermediate ethylene diamine derivative, IV can be obtained from the corresponding amide, N-benzyl-2-phenyl-2-(4-phenyl-1-piperidyl)acetamide, III by use of a suitable reducing agent. In the equation above, the reducing agent is lithium aluminum hydride, which is generally used in the presence of a suitable inert solvent such as tetrahydrofuran (THF) under reflux. Other chemical reducing agents can also be used for reduction of the amide, III.

The intermediate, III can be obtained from the condensation of N-benzyl-α-chlorophenylacetamide, II with 4-phenylpiperidine as shown in the above equation. This condensation can be most satisfactorily accomplished by the use of a base and a suitable solvent. It can also appropriately be conducted under reflux.

As shown above, II can be prepared by reacting α-chlorophenylacetyl chloride, I with benzylamine under Schotten-Baumann conditions, for example, by reaction in a suitable inert solvent such as benzene with an aqueous base such as sodium hydroxide.

Details of the synthesis of V are set forth in Example 1 below.

Compounds in which $R^3$ is hydrogen and $R^2$ is phenyl can be prepared by a similar sequence of reactions as illustrated in the following equations, which show the preparation of a representative compound, N-benzyl-N-[1-phenyl-2-(4-phenyl-1-piperidyl)ethyl]propionamide, IX, in which $R^1$ is ethyl, $R^2$ is phenyl, $R^3$ is hydrogen and B is 4-phenyl-1-piperidyl:

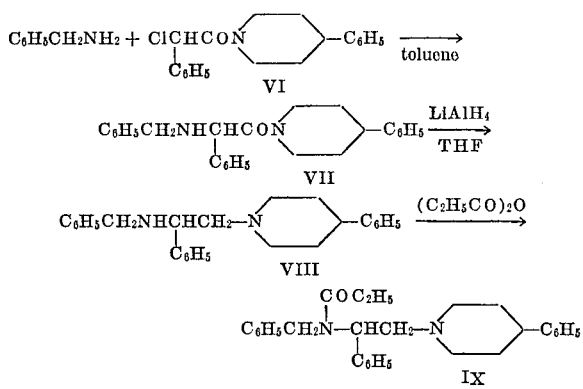

As can be seen from these equations, the preparation of this compound utilizes an acylation step similar to that shown above and a similar reduction step. However, the intermediate VII results from the condensation of 1-(α-chlorophenylacetyl)-4-phenylpiperidine with benzylamine.

Details of the synthesis of IX are set forth in Example 2, below.

The product phenyl substituted N-(2-aminoethyl)-N-benzylamide, V or IX can be recovered as a crystalline solid in the form of its free base or conveniently converted to various acid addition salts by reaction with the appropriate acid.

Other compounds coming within the scope of this invention can be similarly prepared and furnished as free bases or in the form of various salts. For the purpose of using compounds of this invention in pharmacological application it is, of course, desired that the salts should be pharmacologically acceptable. However, other salts than those which are pharmacologically suitable can be prepared for other than pharmacological uses such as for separating mixtures of various isomers of these compounds or mixtures of these compounds with contaminating products of side reactions.

The compounds of this invention have useful pharmacological activity. For example, they display analgetic activity. They can be formulated in unit dosage forms according to methods well known to those skilled in the art.

Medications including these compounds as active ingredients are effectively administered orally, intravenously, intraperitoneally and by similar accepted methods. Suitable medications may be formed by combining one or more of the active ingredients, as a free base or preferably as a pharmacologically acceptable acid addition salt, in unit dosages with commonly accepted diluents and tableting adjuncts such as cellulose powder, corn starch, lactose, talc, stearic acid gums and the like in accordance with pharmaceutically accepted manufacturing practices. Medications may also be formed by combining the water soluble salt with water, glucose solution and similar liquid carriers. These medications may be either in solid or liquid state and may be compounded as tablets, powders, capsules, suspensions and similar dosage forms.

Analgetic activity was observed when medications including compounds of this invention as an active ingredient were administered to a group of test animals. To determine this analgetic activity, an artery clip screen with mice substantially as described by Bianchi, C. and Franceschini, J., in "Experimental Observations on Haffner's Method for Testing Analgesic Drugs," Brit. J. Pharmacol., 9:280 (1954) was used.

The medication was prepared by reducing the particle size of an active ingredient, a dl-isomer mixture of N - benzyl - N - [2-phenyl-2-(4-phenyl-1-piperidyl)ethyl]-propionamide and suspending it in saline using a synthetic detergent as the suspending agent. An $ED_{50}$ (dose at which analgesia was evident in 50% of the animals) of 2.95 mg./kg. was observed when this medication was administered intraperitoneally to a group of mice according to accepted techniques. An $ED_{50}$ of 3.95 mg./kg. was observed when this medication was administered by gastric intubation to a group of mice. This compound was found to have an advantageously low oral to intraperitoneal ratio of $ED_{50}$'s of 1:3. Such a low ratio is indicative that the compound may be administered effectively by the desirable oral route.

This compound was also tested to determine $LD_{50}$ (dose which kills 50% of animals in a group). Medication was administered intraperitoneally in varying doses to a group of test mice and an $LD_{50}$ of 316 mg./kg. was observed.

A determination of $ED_{50}$ was made in a similar manner with the d-isomer of this compound and a medication prepared as described above. An $ED_{50}$ of 1.7 mg./kg. was observed when the medication was administered intraperitoneally to a group of mice.

The l-isomer of this compound was also tested according to the artery clip method for analgetic activity. An $ED_{50}$ of 70 mg./kg. was observed when the medication was administered intraperitoneally to a group of mice. With the l-isomer a reduction in fecal output was observed in the test animals, a property indicative of antidiarrheal activity.

This invention will be better understood by reference to the following examples which are not, however, to be construed as limiting the scope of this invention, which is defined in the claims appended hereto.

EXAMPLE 1

N-benzyl-N-[2-phenyl-2-(4-phenyl-1-piperidyl)ethyl] propionamide (a) N-Benzyl-α-chlorophenylacetamide.—A benzene solution of α-chlorophenylacetyl chloride (113.5 g., 0.6 mole) was slowly added to an ice-cold, stirred solution of benzylamine (64.4 g., 0.6 mole) in 650 ml. of benzene and 200 ml. of 20% NaOH and the mixture was stirred in the cold for an additional hour. The mixture was filtered, and the collected solid and the solid obtained from concentration of the filtrate were recrystallized from an aqueous methanol solution. Yield 145 g., M.P. 96.5–97.0° C.

*Analysis.*—Calcd. for $C_{15}H_{14}ClNO$ (percent): N, 5.39. Found (percent): N, 5.28.

(b) N - benzyl-2-phenyl-2-(4-phenyl-1-piperidyl)acetamide.—A mixture of N-benzyl-α-chlorophenylacetamide (62 g., 0.239 mole), 4-phenylpiperidine (38.5 g., 0.239 mole), sodium carbonate (28.6 g., 0.27 mole) and 350 ml. of DMF was heated under reflux with stirring for 20 hours. The mixture was filtered and the filtrate was diluted with methanol and water and cooled. The solid that formed was collected and dried. Yield 73.2 g., M.P. 133–134° C.

*Analysis.*—Calcd. for $C_{26}H_{28}N_2O$ (percent): N, 7.29. Found (percent): N, 7.42.

(c) N-[2-phenyl-2-(4-phenyl-1-piperidyl)ethyl]benzylamine.—A THF solution of N - benzyl - 2 - phenyl-2-(4-phenyl-1-piperidyl)acetamide (73 g., 0.19 mole) was slowly added to a stirred suspension of $LiAlH_4$ (11 g., 0.285 mole) in 150 ml. of THF and the mixture was heated under reflux for 16 hours. The cooled mixture was reacted with 11 ml. of water in THF (dropwise), followed by 11 ml. of 20% NaOH and 33 ml. of water. The mixture was filtered and the filtrate was concentrated and distilled, B.P. 210–218° C. (0.15 mm.), yield 46 g.

*Analysis.*—Calcd. for $C_{26}H_{30}N_2$ (percent): N (basic), 7.56. Found (percent): N (basic), 7.54.

(d) N-benzyl-N-[2-phenyl-2-(4-phenyl-1-piperidyl)ethyl]propionamide oxalate.—A solution of N-[2-phenyl-2-(4-phenyl-1-piperidyl)ethyl]benzylamine (30 g., 0.081 mole), propionic anhydride (10.8 g., 0.083 mole) and 150 ml. of benzene was heated under reflux for 2 hours. The solution was washed with dilute NaOH and with water and dried with MgSO$_4$, filtered and the filtrate concentrated in vacuo to an oil. This free base was dissolved in ether and an ether solution of oxalic acid (9 g., 0.1 mole) was added to form a viscous oil that solidified on cooling. The solid was recrystallized from a 2-propanol-ether solution. Yield 35 g., M.P. 149.0–149.5° C. (d.).

*Analysis.*—Calcd. for C$_{29}$H$_{34}$N$_2$O·C$_2$H$_2$O$_4$ (percent): C, 72.11; H, 6.97; N, 5.42. Found (percent): C, 71.53; H, 6.92; N, 5.42.

(e) (—)N-benzyl - N - [2-phenyl-2-(4-phenyl-1-piperidyl)ethyl]propionamide.—This oxalate salt (0.076 mole) was suspended in dilute NaOH and the free base was extracted with chloroform. The extracts were filtered and concentrated in vacuo. The concentrate and 10.5 g. of d-tartaric acid were dissolved in methanol-2-propanol and diluted with ether with warming until the salt began to form. After cooling the salt was collected and dried. Yield 13 g., M.P. 167–168° C. (d.).

*Analysis.*—Calcd. for C$_{29}$H$_{34}$N$_2$O·C$_4$H$_6$O$_6$ (percent): N, 4.86. Found (percent): N, 4.77. The free base was regenerated to give a syrup, $[\alpha]_D^{CHCl_3}$ −22.3°.

(f) (+)N-benzyl - N - [2-phenyl-2-(4-phenyl-1-piperidyl)ethyl]propionamide.—The filtrate from the tartrate recovery was concentrated in vacuo, suspended in dilute NaOH and the free base was extracted with chloroform. The extracts were dried with MgSO$_4$, filtered and concentrated in vacuo and dried by warming under vacuum pump pressure. Yield 13.1g.

*Analysis.*—Calcd. for C$_{29}$H$_{34}$N$_2$O (percent): N, 6.56. Found (percent): N, 6.15. $[\alpha]_D^{CHCl_3}$ +15.2°.

EXAMPLE 2

N-benzyl-N-[1-phenyl-2-(4-phenyl-1-piperidyl)ethyl] propionamide (a) N-[1-phenyl-2-(4-phenyl-1-piperidyl)ethyl]benzylamine.—α-Chlorophenylacetyl chloride (113.5 g., 0.6 mole) and 4-phenylpiperidine (96.6 g., 0.6 mole) were reacted under Schotten-Baumann conditions to give an oil, 1-(α-chlorophenylacetyl)-4-phenylpiperidine. This oil was dissolved in 600 ml. toluene and half of this solution (ca. 0.3 mole), benzylamine (64.2 g., 0.6 mole) and potassium iodide (1 g.) were heated under reflux with stirring for 20 hours. The solid benzylamine hydrochloride was collected and the filtrate was concentrated in vacuo to an oil. The concentrate was dissolved in THF and added dropwise to a stirred suspension of LiAlH$_4$ (17.1 g., 0.45 mole) in 250 ml. of THF and the mixture was treated with a THF solution containing 17 ml. of water (dropwise), followed by 17 ml. of 20% NaOH and 51 ml. of water. The mixture was filtered and the filtrate was concentrated in vacuo to a solid that gave a very weak amide carbonyl band at 1645 cm.$^{-1}$ in the I.R. The solid amine was recrystallized from an acetone-2-propanol-dimethyl formamide-n-hexane solution. Yield 50 g., M.P. 127.5° C.

*Analysis*—Calcd. for C$_{26}$H$_{30}$N$_2$ (percent): N, 7.57. Found (percent): N, 7.29.

(b) N-benzyl-N-[1-phenyl-2-(4-phenyl-1-piperidyl)ethyl]proprionamide oxalate.—A solution of N-[1-phenyl-2-(4-phenyl-1-piperidyl)ethyl]benzylamine (25 g., 0.0676 mole), propionic anhydride (10.4 g., 0.08 mole) and 200 ml. of benzene was heated under reflux for 3 hours. The solution was concentrated *in vacuo* to an oil. $\nu_{max}^{CHCl_3}$: 1640 cm.$^{-1}$ (amide C=O), no N–H.

An ether solution of oxalic acid (7.2 g., 0.08 mole) was added to an ether solution of the free base and the solid that formed was collected and recrystallized three times from a methanol-ether solution. Yield 22.3 g., M.P. 133.0–134.5° C. (d.).

*Analysis.*—Calcd. for C$_{29}$H$_{34}$N$_2$O·C$_2$H$_2$O$_4$ (percent): C, 72.11; H, 6.97; N, 5.42. Found (percent): C, 71.69; H, 7.20; N, 5.37.

EXAMPLE 3

(a) N-benzyl-N-[1-phenyl-2-(4-phenyl-1-piperidyl)ethyl]cyclopropylcarboxamide.—N - [1 - phenyl-2-(4-phenyl-1-piperidyl)ethyl]benzylamine (22 g., 0.0595 mole) and cyclopropanecarboxylic acid chloride (6.3 g., 0.06 mole) were reacted under Schotten-Baumann conditions to give a solid that was recrystallized from an aqueous DMF-methanol solution. Yield 23.8 g., M.P. 114.5–115.0° C.

*Analysis.*—Calcd. for C$_{30}$H$_{34}$N$_2$O (percent): N, 6.39. Found (percent): N, 6.45.

(b) N - benzyl-N-[1 - phenyl-2-(4-phenyl-1-piperidyl)-ethyl]cyclopropylcarboxamide maleate.—The free base (23 g., 0.052 mole) and 7 g. of maleic acid were dissolved in hot methanol, filtered and the filtrate was diluted with ether to form a solid. The solid was recrystallized from a methanol ether solution. Yield 24.2 g. M.P. 155.5–156.5 C. (d.).

*Analysis.*—Calcd. for C$_{30}$H$_{34}$N$_2$O·C$_4$H$_4$O$_4$ (percent): C, 73.66; H, 6.86; N, 5.05. Found (percent): C, 73.63; H, 6.97; N, 5.06.

EXAMPLE 4

N-benzyl-N-[1-phenyl-2-(4-hydroxy-4-phenyl-1-piperidyl)ethyl]propionamide (a) N-[1-phenyl-2-(4 - hydroxy-4-phenyl-1-piperidyl)-ethyl]benzylamine.—1-(α - chlorophenylacetyl) - 4 - hydroxy-4-phenylpiperidine (75.4 g., 0.228 mole), benzylamine (49 g., 0.456 mole), potassium iodide (1 g.) and 350 ml. of toluene were heated under reflux with stirring for 18 hours, filtered and the filtrate was concentrated in vacuo to an oil. A THF solution of the concentrate was slowly added to a stirred suspension of LiAlH$_4$ (13 g., 0.342 mole) in 150 ml. of THF and the mixture was heated under reflux for 8 hours. The mixture was cooled and slowly treated with 13 ml. of water in THF, followed by 13 ml. of 20% NaOH and 39 ml. of water. The mixture was filtered and the filtrate was concentrated in vacuo to an oil. The oil crystallized from an aqueous acetone solution and the solid was recrystallized from an aqueous acetone solution. Yield 40 g., M.P. 121–123° C.

*Analysis.*—Calcd. for C$_{26}$H$_{30}$N$_2$O (percent): N, 7.25. Found (percent): N, 7.23.

(b) N - benzyl-N-[1-phenyl-2-(4 - hydroxy-4-phenyl-1-piperidyl)ethyl]propionamide.—A solution of N-[1-phenyl-2-(4 - hydroxy-4-phenyl-1-piperidyl)ethyl]benzylamine (20 g., 0.052 mole), propionic anhydride (7.4 g., 0.057 mole) and 200 ml. of benzene was heated under reflux for 3 hours. The solvent was removed in vacuo and the solid was recrystallized from an aqueous DMF-methanol solution. Yield 20.3 g., M.P. 170–171° C.

*Analysis.*—Calcd. for C$_{29}$H$_{34}$N$_2$O$_2$ (percent): N, 6.33. Found (percent): N, 6.44.

The free base (20 g., 0.045 mole) and 8 g. of maleic acid were dissolved in hot methanol, filtered and the filtrate was diluted with ether to form a solid salt. The salt was recrystallized from a methanol-ether solution. Yield 21.3 g., M.P. 189.5–190.5° C. (d.).

*Analysis.*—Calcd. for C$_{29}$H$_{34}$N$_2$O$_2$·C$_4$H$_4$O$_4$ (percent): C, 70.98; H, 6.81; N, 5.02. Found (percent): C, 70.31; H, 6.67; N, 5.03.

What is claimed is:
1. A compound selected from the group consisting of compounds of the formula

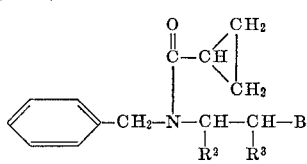

in which R$^2$ is hydrogen or phenyl, R$^3$ is hydrogen or phenyl, only one of R$^2$ or R$^3$ being hydrogen in a given compound, and B is 1-piperidyl, 4-phenyl-1-piperidyl or 4-hydroxy-4-phenyl-1-piperidyl, and pharmacologically acceptable salts thereof.

2. A compound according to claim 1 which is N-benzyl-N-[1-phenyl-2-(4 - phenyl-1-piperidyl)ethyl]cyclopropylcarboxamide.

References Cited

UNITED STATES PATENTS 3,016,382   1/1962   Wright et al. _____ 260—294
3,234,276   2/1966   Petracek _____ 260—558

HENRY R. JILES, Primary Examiner

G. T. TODD, Assistant Examiner

U.S. Cl. X.R.

260—247.2, 268, 293, 294.7; 424—267